(12) United States Patent
Tang (10) Patent No.: US 11,540,215 B2
(45) Date of Patent: Dec. 27, 2022

(54) PAGING METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/891,639

(22) Filed: Jun. 3, 2020

(65) Prior Publication Data

US 2020/0296670 A1    Sep. 17, 2020

Related U.S. Application Data

(63) Continuation of application No. PCT/CN2018/074763, filed on Jan. 31, 2018.

(51) Int. Cl.
  *H04W 68/00* (2009.01)
  *H04W 56/00* (2009.01)
  *H04W 52/02* (2009.01)
  *H04W 72/12* (2009.01)
  *H04W 68/02* (2009.01)

(52) U.S. Cl.
  CPC ..... *H04W 52/0229* (2013.01); *H04W 68/005* (2013.01); *H04W 72/1289* (2013.01); *H04W 68/02* (2013.01)

(58) Field of Classification Search
  None
  See application file for complete search history.

(56) References Cited

U.S. PATENT DOCUMENTS

| 2010/0202382 | A1  | 8/2010  | Park et al. |
| 2010/0255859 | A1  | 10/2010 | Chun et al. |
| 2017/0367069 | A1  | 12/2017 | Agiwal et al. |
| 2020/0245288 | A1* | 7/2020  | Liu ............... H04W 72/042 |

FOREIGN PATENT DOCUMENTS

| CN | 101843153 A   | 9/2010 |
| CN | 107251625 A   | 10/2017 |
| CN | 107258105 A   | 10/2017 |
| CN | 107637147 A   | 1/2018 |
| WO | 2016163127 A1 | 10/2016 |

(Continued)

OTHER PUBLICATIONS

International Search Report dated Oct. 19, 2018 of PCT/CN2018/074763 (4 pages).

(Continued)

*Primary Examiner* — Gary Lafontant
(74) *Attorney, Agent, or Firm* — Perkins Coie LLP (57) ABSTRACT

Disclosed by the implementations of the present application are a paging method, a terminal device and a network device, the method comprising: a terminal device determines a target control resource set (CORSET) corresponding thereto among a plurality of CORSETs; the terminal device receives a physical downlink control channel (PDCCH) used for scheduling a paging message in a common search space within the target CORSET, and according to the PDCCH, acquires the paging message.

13 Claims, 6 Drawing Sheets

(56) References Cited

FOREIGN PATENT DOCUMENTS

| WO | 2017079574 A1 | 5/2017 | | |
| WO | 2017171454 A1 | 10/2017 | | |
| WO | 2017174469 A1 | 10/2017 | | |
| WO | 2017176438 A1 | 10/2017 | | |
| WO | 2017214967 A1 | 12/2017 | | |
| WO | 2017222309 A1 | 12/2017 | | |
| WO | WO-2017214967 A1 | * | 12/2017 | ............ H04W 72/04 |
| WO | WO-2018029643 A1 | * | 2/2018 | .......... H04W 74/006 |

OTHER PUBLICATIONS

EPO, Examination Report for European Patent Application No. 18903120.6. dated Feb. 3, 2021. 6 pages.

IPA, Examination Report No. 1 for Australian Patent Application No. 2018405869, dated Feb. 19, 2021. 4 pages.

Supplementary European Search Report dated Oct. 9, 2020 of European Patent Application No. 18903120.6 (8 pages).

CNIPA, First Office Action for Chinese Patent Application No. 202010292940.8, dated Apr. 23, 2021. 12 pages with English translation.

EPO, Office Action for European Patent Application No. 18903120.6, dated Jun. 9, 2021. 5 pages.

IPA, Examination Report No. 2 for Australian Patent Application No. 2018405869, dated Jul. 14, 2021. 3 pages.

IPI, Examination Report for Indian Patent Application No. 202017027746, dated Jul. 9, 2021. 7 pages.

KIPO, Notification of Reason for Refusal for Korean Patent Application No. 10-2020-7023428, dated Apr. 28, 2021. 9 pages with English translation.

CIPO, Office Action for Canadian Application No. 3088571, dated Aug. 20, 2021. 4 pages.

CNIPA, Second Office Action for Chinese Application No. 202010292940.8, dated Aug. 9, 2021. 9 pages with English translation.

Huawei et al. "Finalization of NR Paging" R1-1717052; 3GPP TSG RAN WG1 Meeting 90bis Oct. 9-13, 2017. 7 pages.

Huawei et al. "Offline summary for AI 7.1.3 on Paging" R1-1721535; 3GPP TSG RAN WG1 Meeting 91; Nov. 27-Dec. 1, 2017. 6 pages.

IP Australia, Examination Report No. 3 for Australian Application No. 2018405869, dated Oct. 12, 2021. 3 pages.

JPO, Notice of Reasons for Refusal for Japanese Application No. 2020-540727, dated Oct. 8, 2021. 7 pages with English translation.

KIPO, Notice of Final Rejection for Korean Application No. 10-2020-7023428, dated Oct. 26, 2021. 6 pages with English translation.

Samsung "Paging design" R1-1713558; 3GPP TSG RAN WG1 Meeting #90; Aug. 21-25, 2017. 7 pages.

Decision of Rejection for Chinese Application No. 202010292940.8 dated Nov. 2, 2021. 7 pages with English translation.

Examination Report for European Application No. 18903120.6 dated Nov. 23, 2021. 6 pages.

Decision of Refusal for Japanese Application No. 2020-540727 dated Mar. 11, 2022. 8 pages with English translation.

Summons to attend oral proceedings for European Application No. 18903120.6 issued Mar. 25, 2022. 8 pages.

Decision on Reexamination for Chinese Application No. 202010292940.8 dated Sep. 16, 2022. 25 pages with English translation.

Examiner's Report for Canadian Application No. 3088574 dated Jul. 8, 2022. 3 pages.

Notice of Reexamination for Chinese Application No. 202010292940.8 dated Jun. 30, 2022. 14 pages with English translation.

* cited by examiner

A terminal device determines a target control resource set (CORSET) corresponding to the terminal device among multiple CORSETs — S210

The terminal device receives a physical downlink control channel (PDCCH) used for scheduling a paging message in a common search space in the target CORSET — S220

The paging message is acquired according to the PDCCH — S230

A terminal device receives a physical downlink control channel (PDCCH) used for scheduling a paging message, wherein the PDCCH includes indication information and/or rule information, wherein the indication information is used for indicating whether there is a paging message, and the rule information is used for the terminal device to determine whether the paging message is directed to the terminal device — S310

The terminal device determines whether to receive the paging message according to the indication information and/or the rule information — S320

A terminal device receives a physical downlink control channel (PDCCH) used for scheduling a paging message, wherein the PDCCH includes indication information and identifier information of a paged terminal device, wherein the indication information is used for indicating that there is no paging message — S410

Under a situation where identifier information of the paged terminal device includes the identifier information of the terminal device, the terminal device initiates a random access procedure — S420

A network device determines a target control resource set (CORSET) corresponding to at least one paged terminal device among multiple CORSETs — S510

The network device sends a physical downlink control channel (PDCCH) used for scheduling a paging message in a common search space in the target CORSET, wherein the paging message is used for paging the at least one terminal device — S520

A network device sends a physical downlink control channel (PDCCH) used for scheduling a paging message, wherein the PDCCH includes indication information and/or rule information, so that the terminal device determines whether to receive the paging message according to the indication information and/or the rule information, wherein the indication information is used for indicating whether there is a paging message, and the rule information is used for the terminal device to determine whether the paging message is directed to the terminal device ~S610

A network device sends a physical downlink control channel (PDCCH) used for scheduling a paging message, wherein the PDCCH includes indication information and identifier information of a paged terminal device, wherein the indication information is used for indicating that there is no paging message, so that the terminal device initiates a random access procedure under a situation where it determines that identifier information of the paged terminal device includes the identifier information of the terminal device ~S710

PAGING METHOD, TERMINAL DEVICE AND NETWORK DEVICE

CROSS-REFERENCE TO RELATED APPLICATION

This application is a continuation application of International Application No. PCT/CN2018/074763, filed on Jan. 31, 2018, the entire disclosure of which is hereby incorporated by reference.

TECHNICAL FIELD

Implementations of the present application relate to the field of communication, and more particularly, relate to a paging method, a terminal device, and a network device.

BACKGROUND

In a 5G New Radio (NR) system, a core network side may save context information of a terminal device, which may include a Tracking Area list (TA list) of the terminal device. When paging a terminal device, the core network may send paging messages in all base stations in the TA list of the terminal device, and trigger these base stations to send paging to the terminal device in all cells of the base stations.

Correspondingly, the terminal device will receive the paging message sent by the base station to determine whether the paging message pages the terminal device itself. However, in most cases, the paging message pages another terminal device, which increases the power consumption of the terminal device. Therefore, how to perform paging in order to reduce the power consumption of the terminal device is an urgent problem to be solved.

SUMMARY

Implementations of the present application provide a paging method and device.

In a first aspect, a paging method is provided. The paging method includes: determining, by a terminal device, a target control resource set (CORSET) corresponding to the terminal device among multiple CORSETs; receiving, by the terminal device, a physical downlink control channel (PDCCH) used for scheduling a paging message in a common search space in the target CORSET; and acquiring the paging message according to the PDCCH.

Therefore, an terminal device in an implementation of the present application only needs to receive a PDCCH in a common search space of a CORSET corresponding to the terminal device, and does not need to receive a PDCCH in a common search space of every CORSET to obtain a paging message, which is beneficial to reducing the power consumption of the terminal device.

In one possible implementation, determining, by the terminal device, the target control resource set (CORSET) corresponding to the terminal device among the multiple CORSETs includes: determining, by the terminal device, the target CORSET among the multiple CORSETs according to an identifier (ID) of the terminal device.

In one possible implementation, determining, by the terminal device, the target CORSET among the multiple CORSETs according to the identifier (ID) of the terminal device includes: determining, by the terminal device, that a CORSET with an index number k among the multiple CORSETs is the target CORSET, wherein k=M mod N, M is an ID of the terminal device, N is the number of the multiple CORSETs, and mod represents modulo.

In one possible implementation, the ID of the terminal device is an ID used by the terminal device to calculate a paging subframe or paging occasion.

In a second aspect, a paging method is provided. The paging method includes: receiving, by a terminal device, a physical downlink control channel (PDCCH) used for scheduling a paging message, wherein the PDCCH includes indication information and/or rule information, wherein the indication information is used for indicating whether there is a paging message, and the rule information is used for the terminal device to determine whether the paging message is directed to the terminal device; and determining, by the terminal device, whether to receive the paging message according to the indication information and/or the rule information.

Therefore, in a paging method according to an implementation of the present application, a terminal device can determine whether to receive a paging message according to indication information and rule information. Therefore, the terminal device can receive the paging message only when the indication information indicates that there is the paging message and it can determine that the target terminal which the paging message pages includes the terminal device according to the rule information. This is beneficial to reducing the probability of erroneously receiving the paging message of another terminal device, and beneficial to reducing the power consumption of the terminal device since the terminal device only receives the paging message directed to itself.

In one possible implementation, determining, by the terminal device, whether to receive the paging message according to the indication information and/or the rule information includes: if the indication information indicates that there is no paging message, determining, by the terminal device, not to receive the paging message.

In one possible implementation, determining, by the terminal device, whether to receive the paging message according to the indication information and/or the rule information includes: if the indication information indicates that there is a paging message, determining, by the terminal device, whether to receive the paging message according to the rule information.

Optionally, when the indication information indicates that there is a paging message, if the terminal device determines that the paging message is directed to itself according to the rule information, it may not receive a subsequent paging message, and directly initiate a random access procedure.

In one possible implementation, the rule information is used for indicating a rule condition that identifier information of the terminal device needs to satisfy, and determining, by the terminal device, whether to receive the paging message according to the rule information includes: if the identifier information of the terminal device satisfies the rule condition, the terminal device determines that the paging message is directed to the terminal device, and determines to receive the paging message; or if the identifier information of the terminal device does not satisfy the rule condition, the terminal device determines that the paging message is not directed to the terminal device, and determines not to receive the paging message.

In one possible implementation, the rule condition includes at least one of the following: a value of an identifier of the terminal device mod X being Y; a last bit of the identifier of the terminal device being Z; last K bits of the identifier of the terminal device being $a_1 a_2 \ldots a_K$; first L bits of the identifier of the terminal device being $b_1 b_2 \ldots b_L$; and terminal type information of the terminal device. The X, Y, Z, $a_1 a_2$ and $b_1 b_2 \ldots b_L$ are known numbers.

In a third aspect, a paging method is provided. The paging method includes: receiving, by a terminal device, a physical downlink control channel (PDCCH) used for scheduling a paging message, wherein the PDCCH includes indication information and identifier information of a paged terminal device, wherein the indication information is used for indicating that there is no paging message; and under a situation where identifier information of the paged terminal device includes the identifier information of the terminal device, initiating, by the terminal device, a random access procedure.

Therefore, according to a paging method of an implementation of the present application, when the number of paged terminal devices is small, a network device can directly carry identifier information of a paged terminal device in a PDCCH, so that a terminal device can directly determine whether it is paged according to the PDCCH and does not need to receive a paging message to determine whether it is paged, which is beneficial to reducing the power consumption of the terminal device. Further, the terminal device can initiate a random access procedure under a situation where it determines that the terminal device itself is paged, otherwise, the terminal device will not initiate a random access procedure.

In a fourth aspect, a paging method is provided. The paging method includes: determining, by a network device, a target control resource set (CORSET) corresponding to at least one paged terminal device among multiple CORSETs; and sending, by the network device, a physical downlink control channel (PDCCH) used for scheduling a paging message in a common search space in the target CORSET, wherein the paging message is used for paging the at least one terminal device.

In one possible implementation, determining, by the network device, the target control resource set (CORSET) corresponding to the at least one paged terminal device among the multiple CORSETs, includes: determining, by the network device, the target CORSET among the multiple CORSETs according to an identifier (ID) of the at least one terminal device.

In one possible implementation, the at least one terminal device includes a first terminal device, and determining, by the network device, the target CORSET among the multiple CORSETs according to an identifier (ID) of the at least one terminal device, includes: determining, by the network device, that a CORSET with an index number k among the multiple CORSETs is the target corset, wherein k=M mod N, M is an ID of the first terminal device, N is the number of the multiple CORSETs, and mod represents modulo.

In one possible implementation, the ID of the terminal device is an ID used by the terminal device to calculate a paging subframe or paging occasion.

In a fifth aspect, a paging method is provided. The paging method includes: sending, by a network device, a physical downlink control channel (PDCCH) used for scheduling a paging message, wherein the PDCCH includes indication information and/or rule information, so that the terminal device determines whether the paging message is to be received according to the indication information and/or the rule information, wherein the indication information is used for indicating whether there is a paging message, and the rule information is used for the terminal device to determine whether the paging message is directed to the terminal device.

In one possible implementation, the rule information is used for indicating a rule condition that identifier information of the terminal device needs to satisfy.

In one possible implementation, the rule condition includes at least one of the following: a value of an identifier M of the terminal device mod X being Y; a last bit of the identifier M of the terminal device being Z; last K bits of the identifier M of the terminal device being $a_1 a_2 \ldots a_K$; first L bits of the identifier M of the terminal device being $b_1 b_2 \ldots b_L$; and terminal type information of the terminal device.

In a sixth aspect, a paging method is provided. The paging method includes: sending, by a network device, a physical downlink control channel (PDCCH) used for scheduling a paging message, wherein the PDCCH includes indication information and identifier information of a paged terminal device, wherein the indication information is used for indicating that there is no paging message, so that the terminal device initiates a random access procedure under a situation where it determines that identifier information of the paged terminal device includes the identifier information of the terminal device.

In a seventh aspect, a terminal device is provided for executing the method in the first aspect or in any possible implementation of the first aspect, or executing the method in the second aspect or in any possible implementation of the second aspect, or executing the method in the third aspect or in any possible implementation of the third aspect. Specifically, the terminal device includes a unit configured to execute the method in the first aspect or in any possible implementation of the first aspect, or the terminal device includes a unit configured to execute the method in the second aspect or in any possible implementation of the second aspect, or the terminal device includes a unit configured to execute the method in the third aspect or in any possible implementation of the third aspect.

In an eight aspect, a terminal device is provided, and the terminal device includes a memory, a processor, an input interface and an output interface. The memory, the processor, the input interface and the output interface are connected through a bus system. The memory is configured to store instructions. The processor is configured to execute the instructions stored in the memory, and is configured to execute the method in the first aspect or in any possible implementation of the first aspect, or execute the method in the second aspect or in any possible implementation of the second aspect, or execute the method in the third aspect or in any possible implementation of the third aspect.

In a ninth aspect, a network device is provided and is configured to execute the method in the fourth aspect or in any possible implementation of the fourth aspect, or execute the method in the fifth aspect or in any possible implementation of the fifth aspect, or execute the method in the sixth aspect or in any possible implementation of the sixth aspect. Specifically, the network device includes units configured to execute the method in the fourth aspect or in any possible implementation of the fifth aspect, or execute the method in the fifth aspect or in any possible implementation of the fifth aspect, or execute the method in the sixth aspect or in any possible implementation of the sixth aspect.

In a tenth aspect, a network device is provided, and the network device includes a memory, a processor, an input interface and an output interface. The memory, the processor, the input interface and the output interface are connected through a bus system. The memory is configured to store instructions. The processor is configured to execute the instructions stored in the memory and is configured to execute the method in the fourth aspect or in any possible implementation of the fourth aspect, or execute the method in the fifth aspect or in any possible implementation of the fifth aspect, or execute the method in the sixth aspect or in any possible implementation of the sixth aspect.

In an eleventh aspect, a computer storage medium is provided and is configured to store computer software instructions for executing the methods in the first to the sixth aspects or in any possible implementation of the first to the sixth aspects, and the computer software instructions include programs designed for executing the above aspects.

In a twelfth aspect, a computer program product containing instructions is provided, when the instructions are run on a computer, the computer is caused to execute the methods in the first to the sixth aspects or in any possible implementation of the first to the sixth aspects.

DETAILED DESCRIPTION

Hereinafter, technical solutions in implementations of the present application will be described with reference to accompanying drawings.

The technical solutions of implementations of the present application may be applied to various communication systems, such as a Long Term Evolution (LTE) system, an LTE Frequency Division Duplex (FDD) system, an LTE Time Division Duplex (TDD), and a future 5G system.

Figure 1:
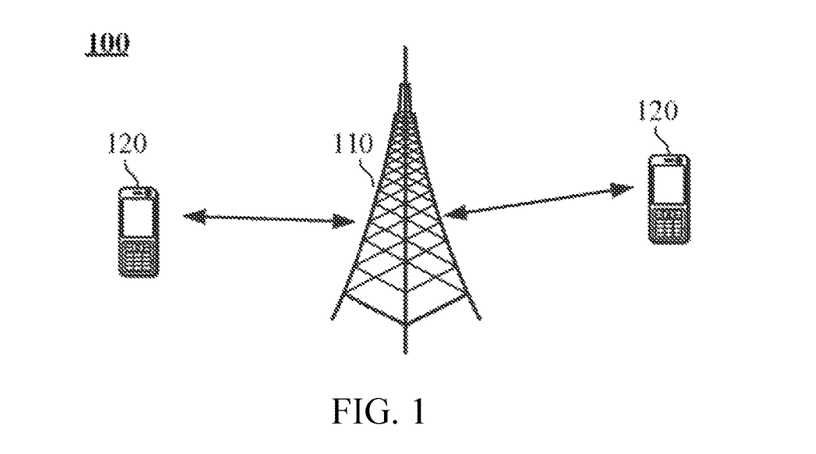
FIG. 1 shows a schematic diagram of an application scenario according to an implementation of the present application.

FIG. 1 shows a wireless communication system 100 to which an implementation of the present application is applied. The wireless communication system 100 may include a network device 110. The network device 110 may be a device that communicates with a terminal device. The network device 110 may provide a communication coverage for a specific geographical region, and may communicate with a terminal device (e.g., UE) in the coverage region. Optionally, the network device 110 may be an evolutional Node B (eNB or eNodeB) in an LTE system, or the network device may be a relay station, an access point, a vehicle-mounted device, a wearable device, a network-side device in a future 5G network, or a network device in a future evolved Public Land Mobile Network (PLMN), etc.

The wireless communication system 100 further includes at least one terminal device 120 in a coverage range of the network device 110. The terminal device 120 may be mobile or fixed. Optionally, the terminal device 120 may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like.

When a terminal device needs to access a network, it needs to obtain system information from the network. Specifically, system information can be obtained through a Physical Broadcast Channel (PBCH) and a Physical Downlink Shared Channel (PDSCH). The Downlink Control Information (DCI) corresponding to the PDSCH is carried on the Physical Downlink Control Channel (PDCCH), and the time-frequency resource location where the PDCCH is located can be indicated by the Control Resource Set (CORSET) information carried by the PBCH, that is, the CORSET can be used for indicating the time-frequency resource information of PDCCH.

In an implementation of the present application, the terminal device can calculate a paging frame (PF, or paging subframe) and paging occasion (PO, or paging time) by itself, and monitor the PDCCH according to the calculated position to obtain the paging message. The PF and PO are both related to an identifier (ID, or UE_ID) and a Discontinuous Reception (DRX) cycle of the terminal device.

Specifically, the position of PF is:
PF=SFN mod T=(T div N)*(UE_ID mod N)
The index of the PO in the PF is:
$i\_s = \text{floor}(UE\_ID/N) \bmod N_S$ Herein, SFN is the system frame number, and UE_ID can be determined according to the International Mobile Subscriber Identification Number (IMSI) of the terminal device, for example, UE_ID=IMSI mod 1024. T represents the DRX cycle of the terminal device. If the upper layer (i.e., non access stratum (NAS)) allocates a dedicated DRX value of the terminal device (i.e., UE Specific DRX), then T is a minimum value of the UE Specific DRX value and a default DRX value broadcast in the system information (i.e. allocated by the cell). If the UE Specific DRX is not configured in the upper layer, the default value is applied. N=min(T, nB), nB values include: 4T, 2T, T, ½T, ¼T, ⅛T, ¹⁄₁₆T, and ¹⁄₃₂T. NS=max(1, nB/T). Mod represents modulo, div represents quotient and remainder, and floor represents rounding down.

A terminal device can monitor a PDCCH according to the paging occasion to obtain a paging message. Further, it can decode the paging message to obtain an identifier of a paged terminal device included in the paging message. If the identifier of the paged terminal device includes its own identifier, it is determined that the paging message is to page the terminal device itself, otherwise, it is determined that the paging message is to page another terminal device.

However, in most cases, the terminal device finds that the paging message is to page another terminal device after decoding the paging message, which increases the power consumption of the terminal device.

In view of this, an implementation of the present application provides a paging method, which is beneficial to reducing the power consumption of a terminal device.

Figure 2:
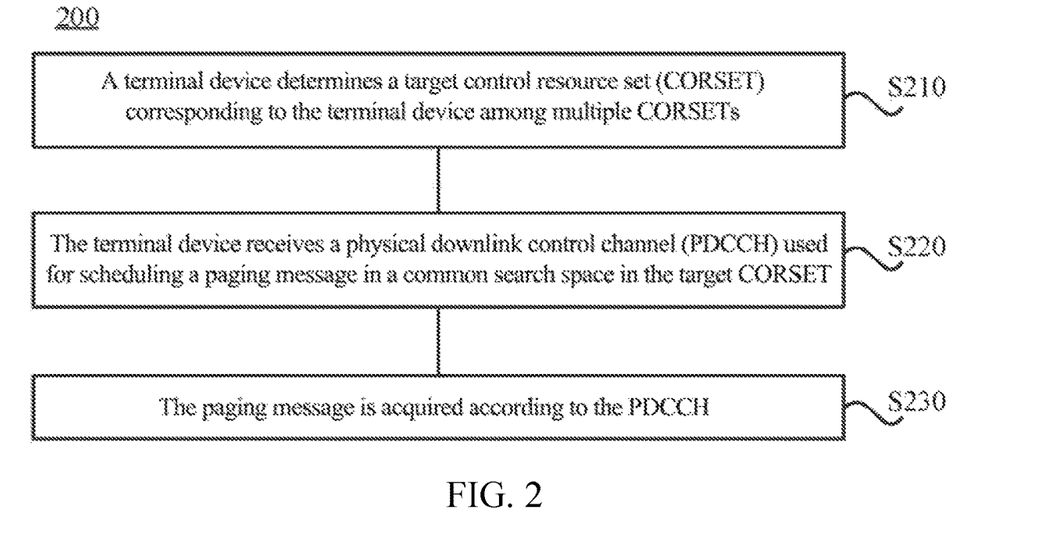
FIG. 2 shows a schematic flow chart of a paging method according to an implementation of the present application.

FIG. 2 is a schematic flowchart of a paging method 200 according to an implementation of the present application. The method 200 may be executed by a terminal device in the communication system 100 shown in FIG. 1. As shown in FIG. 2, the method 200 may include acts S210, S220, and S230.

In the act S210, a terminal device determines a target control resource set (CORSET) corresponding to the terminal device among multiple CORSETs.

In the act S220, the terminal device receives a physical downlink control channel (PDCCH) used for scheduling a paging message in a common search space in the target CORSET.

In the act S230, the paging message is acquired according to the PDCCH.

Specifically, a network device side may be configured with multiple CORSETs, and each CORSET may include a set of time-frequency resources used for PDCCH detection, and the set of time-frequency resources used for PDCCH detection may also be referred to as a PDCCH search space, wherein the PDCCH search space may include a common search space for a PDCCH, and the terminal device may receive a PDCCH in the common search space for the PDCCH.

In an implementation of the present application, each CORSET may correspond to a set of terminal devices, and a terminal device in the set of terminal devices receives a PDCCH used for scheduling a paging message only in a common search space of a corresponding CORSET, and obtains the paging message.

Correspondingly, when a network device pages a specific terminal device, it can determine a CORSET corresponding to the specific terminal device, and then send a PDCCH of a paging message used for paging the specific terminal device in a common search space of the CORSET corresponding to the specific terminal device.

In other words, the network device and the terminal device agree on a time-frequency resource location of a PDCCH used for scheduling a paging message. Therefore, the network device can send the PDCCH on a time-frequency resource of the PDCCH used for paging a first terminal device when paging the first terminal device, and the first terminal device can receive the PDCCH only on the time-frequency resource of the PDCCH for paging the first terminal device. Therefore, the probability that the first terminal device mistakenly receives a paging message of another terminal device can be reduced, and the terminal device in the implementation of the present application does not need to receive a PDCCH in a common search space of each CORSET to obtain a paging message, which is beneficial to reducing the power consumption of the terminal device.

Optionally, in some implementations, the act S210 may include: determining, by the terminal device, the target CORSET among the multiple CORSETs according to an identifier (ID) of the terminal device.

In other words, the terminal device determines the target CORSET among the multiple CORSETs according to the identifier of the terminal device. For example, each COREST can correspond to an identifier, such as UE_ID, of a group of terminal devices, so that the terminal device can determine that a corresponding COREST is the target CORSET according to its own UE_ID in combination with the corresponding relationship, and further can receive a PDCCH used for paging the terminal device in the common search space of the target CORSET and obtain the paging message.

Optionally, in a specific implementation, determining, by the terminal device, the target CORSET among the multiple CORSETs according to the identifier (ID) of the terminal device includes: determining, by the terminal device, that a CORSET with an index number k among the multiple CORSETs is the target CORSET, wherein k=M mod N, M is an ID of the terminal device, N is the number of the multiple CORSETs, and mod represents modulo.

In other words, the index number of each CORSET can correspond to the identifier of a group of terminal devices, that is, the index number of a CORSET may have a corresponding relationship with the identifier of a terminal device. For example, the corresponding relationship between the index number K of a CORSET and the identifier M of a terminal device may be k=M mod N.

For example, if N=20 and M=1919, the index number of the CORSET corresponding to the terminal device can be 19, so that the terminal device identified as 1919 can receive the PDCCH in the common search space of the CORSET with the index number 19 and obtain the paging message of the terminal device. Correspondingly, when the network device pages the terminal device identified as 1919, it can send the PDCCH used for scheduling the paging message in the common search space of the CORSET with the index number 19.

It should be understood that the corresponding relationship between the index number of the CORSET and the identifier of the terminal device is only an example, and should not constitute any limitation to the implementation of the present application. The index number of the CORSET may correspond to the identifier of a group of terminal devices satisfying other conditions. For example, the index number of each CORSET may correspond to the UE_ID within a specific range, and the implementation of the present application does not particularly limit the corresponding relationship between the CORSET and the terminal device.

Optionally, in an implementation of the present application, the identifier of a terminal device used for determining a CORSET may be the UE_ID used for determining a paging subframe or paging occasion.

Figure 3:
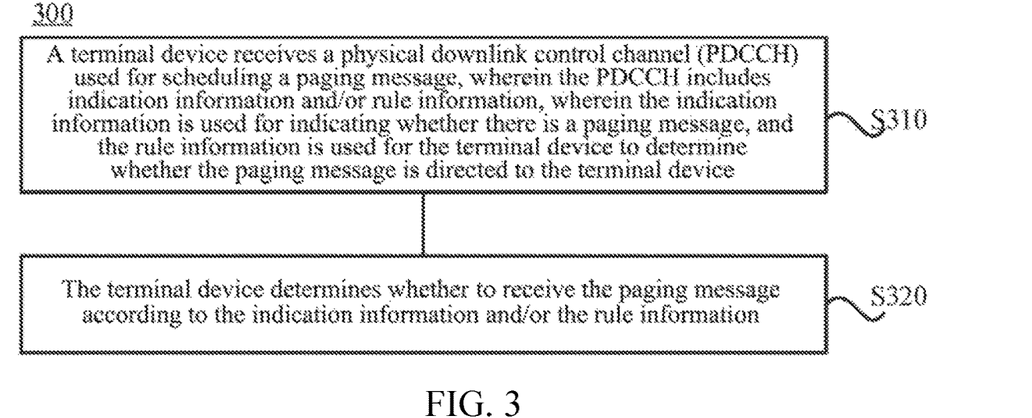
FIG. 3 shows a schematic flow chart of a paging method according to another implementation of the present application.

FIG. 3 illustrates a paging method according to another implementation of the present application. The method 300 may be executed by a terminal device in the communication system 100 shown in FIG. 1. As shown in FIG. 3, the method 300 may include acts S310 and S320.

In the act S310, a terminal device receives a physical downlink control channel (PDCCH) used for scheduling a paging message, wherein the PDCCH includes indication information and/or rule information, wherein the indication information is used for indicating whether there is a paging message, and the rule information is used for the terminal device to determine whether the paging message is directed to the terminal device.

In the act S320, the terminal device determines whether to receive the paging message according to the indication information and/or the rule information.

In the implementation of the present application, the PDCCH for the scheduling paging message may include indication information. The indication information is used for indicating whether there is a paging message, i.e., whether there is a subsequent transmission of a paging message. For example, if the indication information indicates that there is a paging message, in this case, the terminal device may determine whether to receive a subsequent paging message based on the rule information. For example, the rule information can be used for indicating a rule or condition the paged terminal device satisfies. The terminal device can determine to receive the subsequent paging message under a situation where it determines that the rule or condition is satisfied, otherwise, it determines not to receive the subsequent paging message, thus reducing the power consumption of the terminal device. Optionally, if the indication information indicates that there is no paging message, the terminal device may determine not to receive a subsequent paging message. Optionally, if only rule information is included in the PDCCH, the terminal device may determine that there is a paging message, and then determine whether to receive a subsequent paging message based on the rule information.

Therefore, in a paging method according to an implementation of the present application, a terminal device can determine whether to receive a paging message according to indication information and rule information. Therefore, the terminal device can receive the paging message only when the indication information indicates that there is the paging message and it can determine that the target terminal which the paging message pages includes the terminal device according to the rule information. This is beneficial to reducing the probability of erroneously receiving the paging message of another terminal device, and beneficial to reducing the power consumption of the terminal device since the terminal device only receives the paging message directed to itself.

Optionally, in some implementations, if the purpose of the paging message scheduled by the PDCCH is to notify the terminal device of a change in a system broadcast message, in this case, the indication information included in the PDCCH may be used for indicating there is no paging message, so that the terminal device may not need to receive the paging message, thereby reducing the power consumption of the terminal device.

Optionally, in some implementations, the rule information is used for indicating a rule condition that identifier information of the terminal device needs to satisfy, and determining, by the terminal device, whether to receive the paging message according to the rule information includes: if the identifier information of the terminal device satisfies the rule condition, the terminal device determines that the paging message is directed to the terminal device, and determines to receive the paging message; or if the identifier information of the terminal device does not satisfy the rule condition, the terminal device determines that the paging message is not directed to the terminal device, and determines not to receive the paging message.

In other words, the rule information can be used for indicating the rule condition that the identifier information of the paged terminal device needs to satisfy. In this way, the terminal device can determine whether the paging message is directed to the terminal device, that is, whether the terminal device is included in the target terminal device paged by the paging message, according to the identifier information of the terminal device in combination with the rule condition. Further, the terminal device can receive the paging message according to the PDCCH when determining that the paging message is directed to the terminal device, that is, the target terminal device of the paging message signaled includes the terminal device. Otherwise, it determines not to receive the paging message. Therefore, the erroneous reception of a paging message of another terminal device is avoided, and the power consumption of the terminal device can be reduced since the terminal device only receives the paging message that is directed to itself.

Optionally, in some implementations, if the terminal device determines that the paging message is directed to itself according to the rule information, it may not receive the paging message, and directly initiate a random access procedure, thereby reducing the power consumption of the terminal device.

Optionally, in some implementations, the rule condition includes at least one of the following: a value of an identifier of the terminal device mod X being Y; a last bit of the identifier of the terminal device being Z; last K bits of the identifier of the terminal device being $a_1 a_2 \ldots a_K$; first L bits of the identifier of the terminal device being $b_1 b_2 \ldots b_L$; and terminal type information of the terminal device.

The X, Y, Z, $a_1 a_2 \ldots a_K$, and $b_1 b_2 \ldots b_L$ are known numbers.

For example, X=30 and Y=15. If the ID of the terminal device is 1919, the terminal device can determine that the terminal device paged by the paging message does not include itself.

For another example, if Z=9 and the ID of the terminal device is 1919, then the terminal device can determine that the terminal device paged by the paging message includes itself.

For another example, if K=3, a1 a2 a3 is 123, and the ID of the terminal device is 1919, then the terminal device can determine that the terminal device paged by the paging message does not include itself.

For another example, if L=2, b1 b2 is 19, and the ID of the terminal device is 1919, then the terminal device can determine that the terminal device paged by the paging message includes itself.

Figure 4:
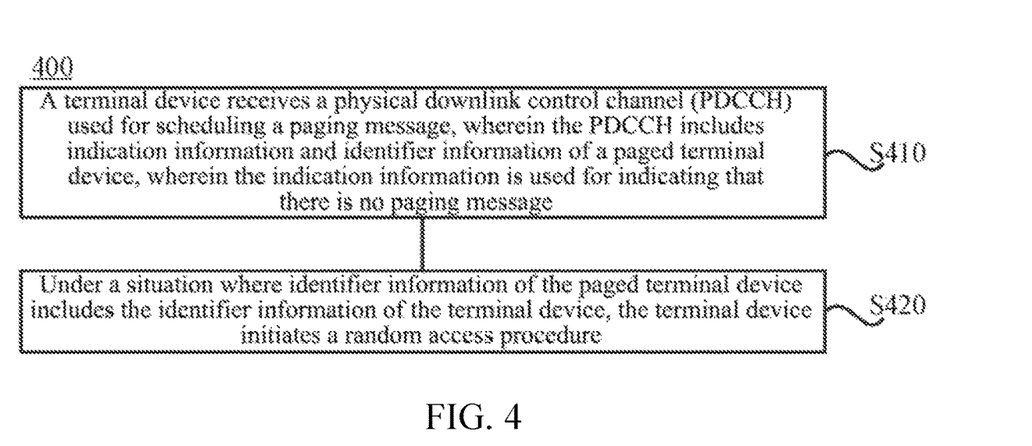
FIG. 4 shows a schematic flow chart of a paging method according to yet another implementation of the present application.

FIG. 4 is a schematic flowchart of a paging method according to yet another implementation of the present application. As illustrated in FIG. 4, the method 400 may include acts S410 and S420.

In the act S410, a terminal device receives a physical downlink control channel (PDCCH) used for scheduling a paging message, wherein the PDCCH includes indication information and identifier information of a paged terminal device, wherein the indication information is used for indicating that there is no paging message.

In the act S420, under a situation where identifier information of the paged terminal device includes the identifier information of the terminal device, the terminal device initiates a random access procedure.

In the implementation of the present application, when the number of paged terminal devices is small, for example, when the number of paged terminal devices is less than a specific threshold, such as 3, the indication information may be used for indicating that there is no paging message, and the network device may carry the identifier information of the paged terminal device in the PDCCH. In this way, the terminal device can directly determine whether it is paged according to the identifier information of the paged terminal device included in the PDCCH. Further, the terminal device can initiate a random access procedure when determining that it is paged, otherwise, it will not initiate a random access procedure.

Therefore, according to the paging method of the implementation of the present application, when the number of paged terminal device is small, the network device can directly carry the identifier information of the paged terminal device in the PDCCH, so that the terminal device can directly determine whether it is paged according to the PDCCH and does not need to receive a paging message, which is beneficial to reducing the power consumption of the terminal device.

The paging method according to an implementation of the present application is described from the perspective of a terminal device above in combination with FIGS. 2 to 4. A paging method according to another implementation of the present application is described from the perspective of a network device below in combination with FIGS. 5 to 7. It should be understood that the description of the network device side corresponds to the description of the terminal device side, and the above description may be referred to for similar descriptions, which will not be repeated here to avoid repetition.

Figure 5:
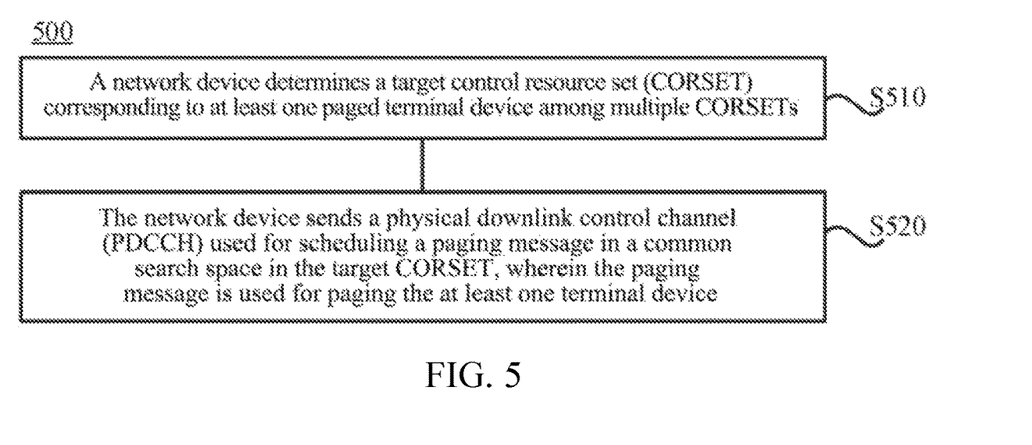
FIG. 5 shows a schematic flow chart of a paging method according to yet another implementation of the present application.

FIG. 5 is a schematic flowchart of a paging method according to an implementation of the present application. The method 500 may be executed by a network device in the communication system 100 shown in FIG. 1. As shown in FIG. 5, the method 500 may include acts S510 and S520.

In the act S510, a network device determines a target control resource set (CORSET) corresponding to at least one paged terminal device among multiple CORSETs.

In the act S520, the network device sends a physical downlink control channel (PDCCH) used for scheduling a paging message in a common search space in the target CORSET, wherein the paging message is used for paging the at least one terminal device.

It should be understood that the target CORSET may include one CORSET, or may include multiple CORSETs, which is not limited by the implementations of the present application.

Optionally, in some implementations, the act S510 may include: determining, by the network device, the target CORSET among the multiple CORSETs according to an identifier (ID) of the at least one terminal device.

Optionally, in some implementations, the at least one terminal device includes a first terminal device, and determining, by the network device, the target CORSET among the multiple CORSETs according to an identifier (ID) of the at least one terminal device, includes: determining, by the network device, that a CORSET with an index number k among the multiple CORSETs is the target CORSET, wherein k=M mod N, M is an ID of the first terminal device, N is the number of the multiple CORSETs, and mod represents modulo.

Optionally, in some implementations, the ID of the terminal device is an ID used by the terminal device to calculate a paging subframe or paging occasion.

Figure 6:
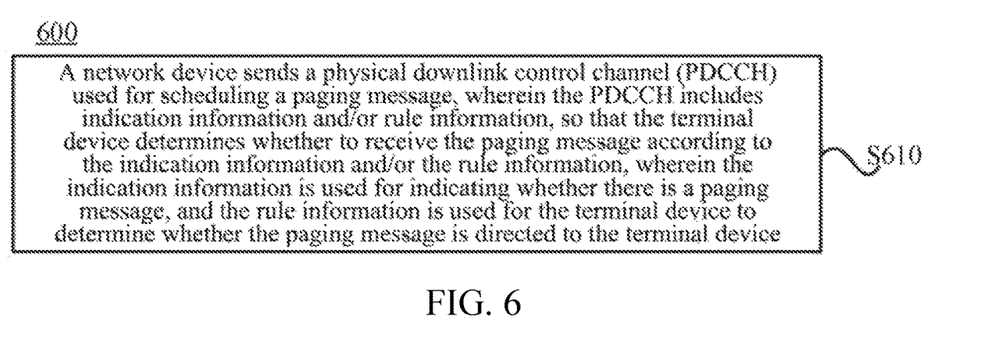
FIG. 6 shows a schematic flow chart of a paging method according to yet another implementation of the present application.

FIG. 6 is a schematic flowchart of a paging method according to another implementation of the present application. The method 600 may be executed by a network device in the communication system 100 shown in FIG. 1. As shown in FIG. 6, the method 600 may include act S610.

In the act S610, a network device sends a physical downlink control channel (PDCCH) used for scheduling a paging message, wherein the PDCCH includes indication information and/or rule information, so that the terminal device determines whether to receive the paging message according to the indication information and/or the rule information, wherein the indication information is used for indicating whether there is a paging message, and the rule information is used for the terminal device to determine whether the paging message is directed to the terminal device.

Optionally, in some implementations, the rule information is used for indicating a rule condition that identifier information of the terminal device needs to satisfy.

Optionally, in some implementations, the rule condition includes at least one of the following: a value of an identifier of the terminal device mod X being Y; a last bit of the identifier of the terminal device being Z; last K bits of the identifier of the terminal device being $a_1 a_2 \ldots a_K$; first L bits of the identifier of the terminal device being $b_1 b_2 \ldots b_L$; and terminal type information of the terminal device. The X, Y, Z, $a_1 a_2 \ldots a_K$, and $b_1 b_2 \ldots b_L$ are known numbers.

Figure 7:
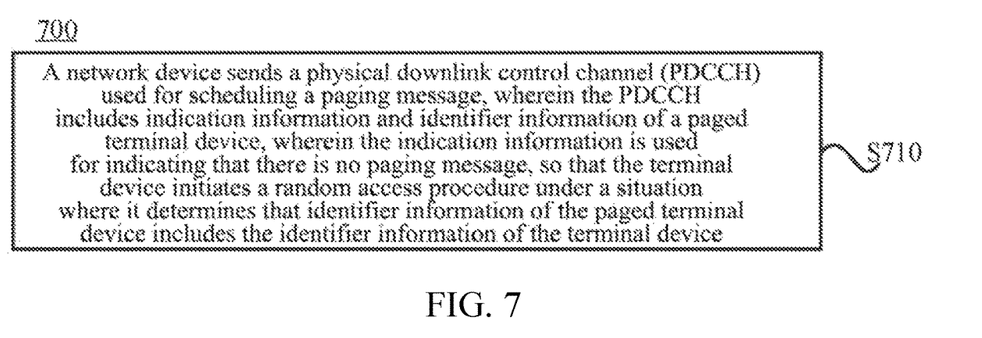
FIG. 7 shows a schematic flow chart of a paging method according to yet another implementation of the present application.

FIG. 7 is a schematic flowchart of a paging method according to yet another implementation of the present application. The method 700 may be executed by a network device in the communication system 100 shown in FIG. 1. As shown in FIG. 7, the method 700 may include act S710.

In the act S710, a network device sends a physical downlink control channel (PDCCH) used for scheduling a paging message, wherein the PDCCH includes indication information and identifier information of a paged terminal device, wherein the indication information is used for indicating that there is no paging message, so that the terminal device initiates a random access procedure under a situation where it determines that identifier information of the paged terminal device includes the identifier information of the terminal device.

Figure 8:
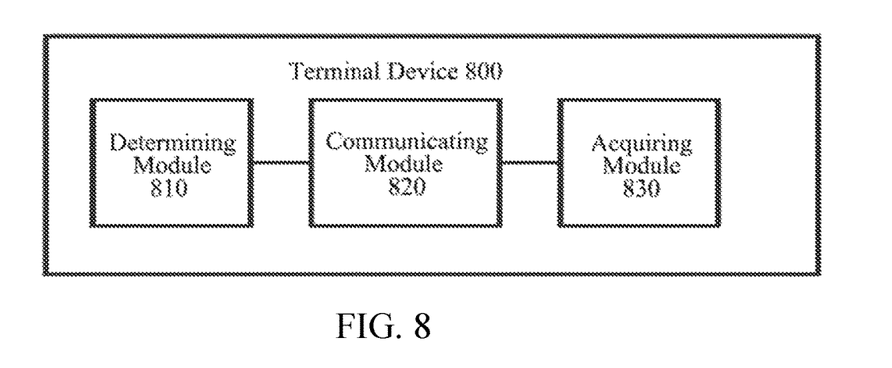
FIG. 8 shows a schematic block diagram of a terminal device according to an implementation of the present application.

FIG. 8 is a schematic block diagram of a terminal device according to an implementation of the present application. As shown in FIG. 8, the terminal device 800 includes a determining module 810, a communicating module 820, and an acquiring module 830.

The determining module 810 is configured to determine a target control resource set (CORSET) corresponding to the terminal device among multiple CORSETs.

The communicating module 820 is configured to receive a physical downlink control channel (PDCCH) used for scheduling a paging message in a common search space in the target CORSET.

The acquiring module 830 is configured to acquire the paging message according to the PDCCH.

Specifically, the terminal device 800 may correspond to (e.g., may be configured as or be) the terminal device described in the method 200, and various modules or units in the terminal device 800 are respectively configured to execute various actions or processes executed by the terminal device in the method 200. Herein, in order to avoid redundancy, detailed description thereof is omitted.

Figure 9:
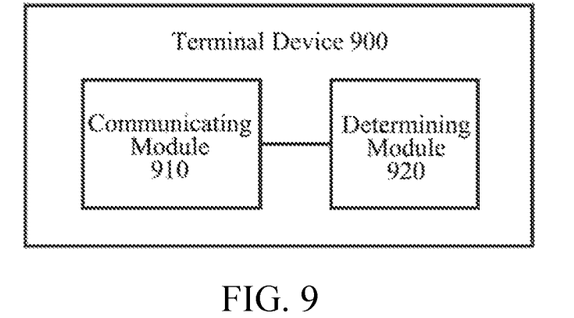
FIG. 9 shows a schematic block diagram of a terminal device according to another implementation of the present application.

FIG. 9 is a schematic block diagram of a terminal device according to an implementation of the present application. As shown in FIG. 9, the terminal device 900 includes a communicating module 910 and a determining module 920.

The communicating module 910 is configured to receive a physical downlink control channel (PDCCH) used for scheduling a paging message, wherein the PDCCH includes indication information and/or rule information, wherein the indication information is used for indicating whether there is a paging message, and the rule information is used for the terminal device to determine whether the paging message is directed to the terminal device.

The determining module 920 is configured to determine whether the paging message is to be received according to the indication information and/or the rule information.

Specifically, the terminal device 900 may correspond to (e.g., may be configured as or be) the terminal device described in the method 300, and various modules or units in the terminal device 900 are respectively configured to execute various actions or processes executed by the terminal device in the method 300. Herein, in order to avoid redundancy, detailed description thereof is omitted.

Figure 10:
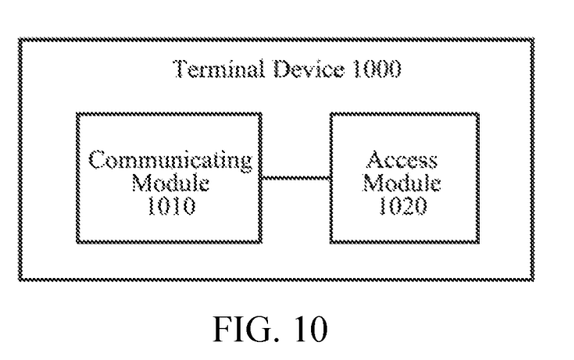
FIG. 10 shows a schematic block diagram of a terminal device according to yet another implementation of the present application.

FIG. 10 is a schematic block diagram of a terminal device according to an implementation of the present application. As shown in FIG. 10, the terminal device 1000 includes a communicating module 1010 and an access module 1020.

The communicating module 1010 is configured to receive a physical downlink control channel (PDCCH) used for scheduling a paging message, wherein the PDCCH includes indication information and identifier information of a paged terminal device, wherein the indication information is used for indicating that there is no paging message.

The access module 1020 is configured to, under a situation where identifier information of the paged terminal device includes the identifier information of the terminal device, initiate a random access procedure.

Specifically, the terminal device 1000 may correspond to (e.g., may be configured as or be) the terminal device described in the method 400, and various modules or units in the terminal device 1000 are respectively configured to execute various actions or processes executed by the network device in the method 400. Herein, in order to avoid redundancy, detailed description thereof is omitted.

Figure 11:
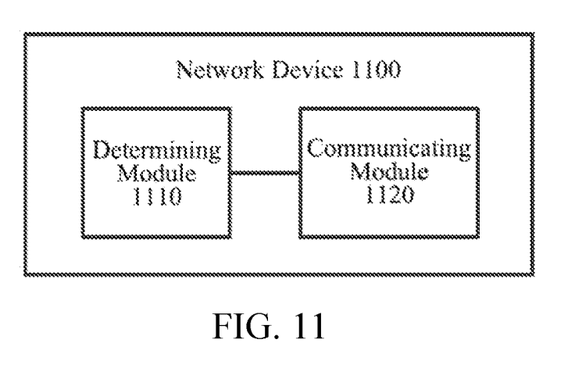
FIG. 11 shows a schematic block diagram of a network device according to an implementation of the present application.

FIG. 11 is a schematic block diagram of a network device according to an implementation of the present application. As shown in FIG. 11, the network device 1100 includes a determining module 1110 and a communicating module 1120.

The determining module 1110 is configured to determine a target control resource set (CORSET) corresponding to at least one paged terminal device among multiple CORSETs.

The communicating module 1120 is configured to send a physical downlink control channel (PDCCH) used for scheduling a paging message in a common search space in the target CORSET, where the paging message is used for paging the at least one terminal device.

Specifically, the network device 1100 may correspond to (e.g., may be configured as or be) the network device described in the method 500, and various modules or units in the network device 1100 are respectively configured to execute various actions or processes executed by the network device in the method 500. Herein, in order to avoid redundancy, detailed description thereof is omitted.

Figure 12:
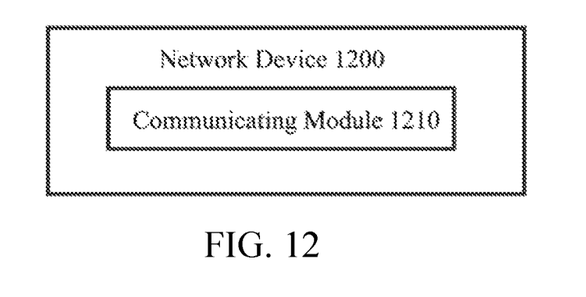
FIG. 12 shows a schematic block diagram of a network device according to another implementation of the present application.

FIG. 12 is a schematic block diagram of a network device according to an implementation of the present application. As shown in FIG. 12, the network device 1200 includes a communicating module 1210.

The communicating module 1210 is configured to send a physical downlink control channel (PDCCH) used for scheduling a paging message, wherein the PDCCH includes indication information and/or rule information, so that the terminal device determines whether to receive the paging message according to the indication information and/or the rule information, wherein the indication information is used for indicating whether there is a paging message, and the rule information is used for the terminal device to determine whether the paging message is directed to the terminal device.

Specifically, the network device 1200 may correspond to (e.g., may be configured as or be) the network device described in the method 600, and various modules or units in the device 1200 are respectively configured to execute various actions or processes executed by the network device in the method 600. Herein, in order to avoid redundancy, detailed description thereof is omitted.

Figure 13:
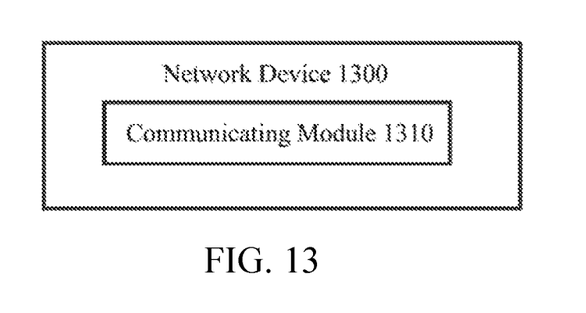
FIG. 13 shows a schematic block diagram of a network device according to yet another implementation of the present application.

FIG. 13 is a schematic block diagram of a network device according to an implementation of the present application. As shown in FIG. 13, the network device 1300 includes a communicating module 1310.

The communicating module 1310 is configured to send a physical downlink control channel (PDCCH) used for scheduling a paging message, wherein the PDCCH includes indication information and identifier information of a paged terminal device, wherein the indication information is used for indicating that there is no paging message, so that the terminal device initiates a random access procedure under a situation where it determines that identifier information of the paged terminal device includes the identifier information of the terminal device.

Specifically, the network device 1300 may correspond to (e.g., may be configured as or be) the network device described in the method 700, and various modules or units in the network device 1300 are respectively configured to execute various actions or processes executed by the network device in the method 700. Herein, in order to avoid redundancy, detailed description thereof is omitted.

Figure 14:
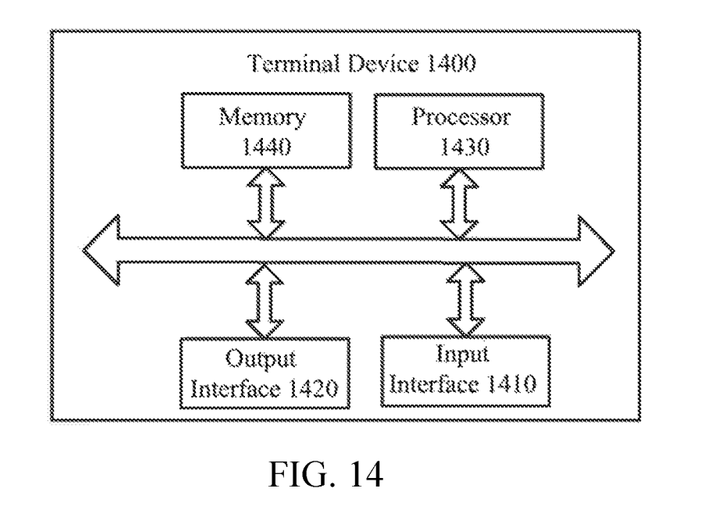
FIG. 14 shows a schematic block diagram of a terminal device according to yet another implementation of the present application.

As shown in FIG. 14, an implementation of the present application provides a terminal device 1400. The terminal device 1400 may be the terminal device 800 in FIG. 8, the terminal device 900 in FIG. 9, or the terminal device 1000 in FIG. 10, and can be configured to execute the contents corresponding to the terminal device in the method 200 shown in FIG. 2, the method 300 shown in FIG. 3, or the method 400 shown in FIG. 4.

The terminal device 1400 includes an input interface 1410, an output interface 1420, a processor 1430, and a memory 1440. The input interface 1410, the output interface 1420, the processor 1430, and the memory 1440 may be connected through a bus system. The memory 1440 is configured to store programs, instructions, or codes. The processor 1430 is configured to execute programs, instructions, or codes in the memory 1440 to control the input interface 1410 to receive signals, to control the output interface 1420 to send signals, and to complete the operations in the foregoing method implementations.

It should be understood that in the implementations of the present application, the processor 1430 may be a Central Processing Unit (CPU), or the processor 1430 may be other general-purpose processor, digital signal processor (DSP), application specific integrated circuits (ASIC), field programmable gate arrays (FPGA) or other programmable logic device, discrete gate or transistor logic device, discrete hardware components, etc. The general-purpose processor may be a microprocessor, or the processor may be any conventional processor or the like.

The memory 1440 may include the read only memory and random access memory, and provide instructions and data to the processor 1430. A portion of memory 1440 may include non-transitory random access memory. For example, the memory 1440 may also store information of device type.

In implementation processes, various contents of the methods described above may be accomplished by integrated logic circuits of hardware or instructions in the form of software in the processor 1430. The contents of the method disclosed in connection with the implementations of the present application may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 1440, and the processor 1430 reads information in the memory 1440 and completes the contents of the above method in combination with its hardware. In order to avoid repetition, it will not be described in detail here.

In a specific implementation, the determining module 810 or the acquiring module 830 included in the terminal device 800 in FIG. 8 may be implemented by the processor 1430 in FIG. 14, and the communicating module 820 included in the terminal device 800 in FIG. 8 may be implemented by the input interface 1410 and the output interface 1420 in FIG. 14.

In another specific implementation, the determining module 920 included in the terminal device 900 in FIG. 9 may be implemented by the processor 1430 in FIG. 14, and the communicating module 910 included in the terminal device 900 in FIG. 9 may be implemented by the input interface 1410 and the output interface 1420 in FIG. 14.

In yet another specific implementation, the access module 1020 and the communicating module 1010 included in the terminal device 1000 in FIG. 10 may be implemented by the input interface 1410 and the output interface 1420 in FIG. 14.

Figure 15:
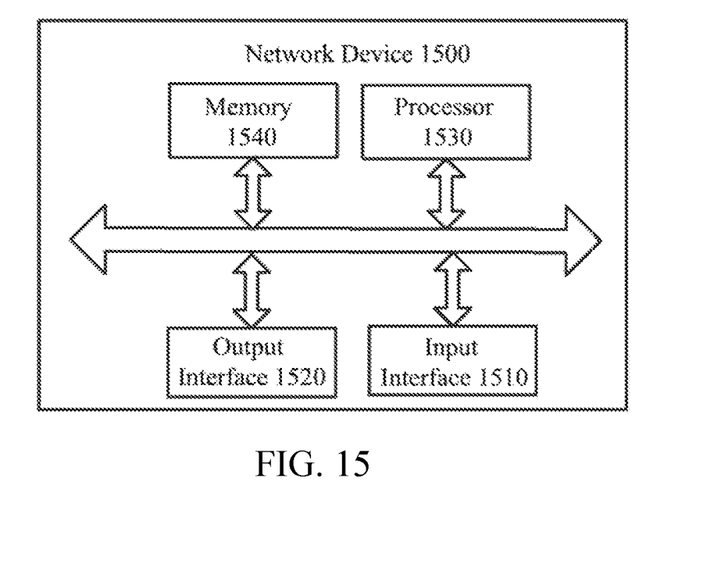
FIG. 15 shows a schematic block diagram of a network device according to yet another implementation of the present application.

As shown in FIG. 15, an implementation of the present application further provides a network device 1500. The network device 1500 may be the network device 1100 in FIG. 11, the network device 1200 in FIG. 12, or the network device 1300 in FIG. 13, and can be configured to execute the contents corresponding to the network device in the method 500 in FIG. 5, the method 600 in FIG. 6, or the method 700 in FIG. 7.

The network device 1500 includes an input interface 1510, an output interface 1520, a processor 1530, and a memory 1540. The input interface 1510, the output interface 1520, the processor 1530, and the memory 1540 may be connected through a bus system. The memory 1540 is configured to store programs, instructions, or codes. The processor 1530 is configured to execute programs, instructions, or codes in the memory 1540 to control the input interface 1510 to receive signals, to control the output interface 1520 to send signals, and to complete the operations in the foregoing method implementations.

It should be understood that in the implementations of the present application, the processor 1530 may be a Central Processing Unit (CPU), or the processor 1530 may be other general-purpose processor, a digital signal processor (DSP), an application specific integrated circuit (ASIC), a field programmable gate array (FPGA) or other programmable logic device, a discrete gate or a transistor logic device, a discrete hardware components, etc. The general-purpose processor may be a microprocessor, or the processor may be any conventional processor or the like.

The memory 1540 may include the read only memory and random access memory, and provide instructions and data to the processor 1530. A portion of memory 1540 may include non-transitory random access memory. For example, the memory 1540 may also store information of device type.

In implementation processes, various contents of the methods described above may be accomplished by integrated logic circuits of hardware or instructions in the form of software in the processor 1530. The contents of the method disclosed in connection with the implementations of the present application may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 1540, and the processor 1530 reads information in the memory 1540 and completes the contents of the above method in combination with its hardware. In order to avoid repetition, it will not be described in detail here.

In a specific implementation, the determining module 1110 included in the network device 1100 in FIG. 11 may be implemented by the processor 1530 in FIG. 15, and the communicating module 1120 included in the network device 1100 in FIG. 11 may be implemented by the input interface 1510 and the output interface 1520 in FIG. 15.

In another specific implementation, the communicating module 1210 included in the network device 1200 in FIG. 12 may be implemented by the input interface 1510 and the output interface 1520 in FIG. 15.

In yet another specific implementation, the communicating module 1310 included in the network device 1300 in FIG. 13 may be implemented by the input interface 1510 and the output interface 1520 in FIG. 15.

An implementation of the present application further provides a computer readable storage medium, the computer readable storage medium stores one or more programs including instructions which, when executed by a portable electronic device including multiple application programs, enable the portable electronic device to execute the methods of the implementations shown in FIGS. 2 to 7.

The implementation of the present application further provides a computer program, which includes instructions which, when executed by a computer, enable the computer to execute the corresponding flows of the methods of the implementations shown in FIGS. 2 to 7.

Those of ordinary skill in the art will recognize that the exemplary elements and algorithm acts described in combination with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present application.

Those skilled in the art may clearly understand that for convenience and conciseness of description, the specific working processes of the systems, apparatuses and units described above may refer to the corresponding processes in the method implementations and will not be described here.

In several implementations provided by the present application, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present application may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present application, in essence, or the part contributing to the prior art, or the part of the technical solution, may be embodied in the form of a software product stored in a storage medium, including a number of instructions for causing a computer device (which may be a personal computer, a server, or a network device or the like) to perform all or part of the acts of the method described in various implementations of the present application. The aforementioned storage media include U disk, mobile hard disk, read-only memory (ROM), random access memory (RAM), magnetic disk or optical disk, and other media capable of storing program codes.

What are described above are merely exemplary implementations of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be determined by the protection scope of the claims.

What is claimed is:

1. A paging method, comprising:
   receiving, by a terminal device, a physical downlink control channel (PDCCH) used for scheduling a paging message, wherein
   the PDCCH comprises downlink control information (DCI) which includes indication information, wherein the indication information is used for indicating whether there is a paging message; and the method further comprises: determining, by the terminal device, whether to receive the paging message according to the indication information; or,
   the PDCCH comprises DCI which includes indication information and rule information, wherein the indication information is used for indicating whether there is a paging message, and the rule information is used for the terminal device to determine whether the paging message is directed to the terminal device; and the method further comprises: determining, by the terminal device, whether to receive the paging message according to the indication information and the rule information.

2. The method according to claim 1, wherein determining, by the terminal device, whether to receive the paging message according to the indication, or according to the indication information and information and the rule information comprises:
   when the indication information indicates that there is no paging message, determining, by the terminal device, not to receive the paging message.

3. The method according to claim 1, wherein determining, by the terminal device, whether to receive the paging message according to the indication information, or according to the indication information and the rule information comprises:
   when the indication information indicates that there is a paging message, determining, by the terminal device, whether to receive the paging message according to the rule information.

4. The method according to claim 3, wherein the rule information comprises a rule condition that identifier information of the terminal device needs to satisfy, and wherein:
   when the identifier information of the terminal device satisfies the rule condition, the terminal device determines to receive the paging message; or
   when the identifier information of the terminal device does not satisfy the rule condition, the terminal device determines not to receive the paging message.

5. The method according to claim 4, wherein the rule condition comprises at least one of following:
   a value of an identifier of the terminal device mod X being Y;
   a last bit of the identifier of the terminal device being Z;
   last K bits of the identifier of the terminal device being $a_1 a_2 \ldots a_K$;
   first L bits of the identifier of the terminal device being $b_1 b_2 \ldots b_L$; and
   terminal type information of the terminal device,
   wherein the X, Y, Z, a1 a2 . . . aK, and b1 b2 . . . bL are known numbers.

6. A terminal device, comprising:
   an input interface, configured to receive a physical downlink control channel (PDCCH) used for scheduling a paging message, wherein the PDCCH comprises indication information and/or rule information, wherein
   the PDCCH comprises downlink control information (DCI) which includes indication information, wherein the indication information is used for indicating whether there is a paging message; and the terminal device further comprises a processor, configured to determine whether the paging message is to be received according to the indication information; or,
   the PDCCH comprises DCI which includes indication information and rule information, wherein the indication information is used for indicating whether there is a paging message, and the rule information is used for the terminal device to determine whether the paging message is directed to the terminal device; and the terminal device further comprises a processor, configured to determine whether the paging message is to be received according to the indication information and the rule information.

7. The terminal device according to claim 6, wherein the processor is configured to:
when the indication information indicates that there is no paging message, determine that the paging message is not to be received.

8. The terminal device according to claim 6, wherein the processor is further configured to:
when the indication information indicates that there is a paging message, determine whether the paging message needs to be received according to the rule information.

9. The terminal device according to claim 8, wherein the rule information is used for indicating a rule condition that identifier information of the terminal device needs to satisfy, and the processor is configured to:
when the identifier information of the terminal device satisfies the rule condition, determine that the paging message is directed to the terminal device, and determine that the paging message is to be received; or
when the identifier information of the terminal device does not satisfy the rule condition, determine that the paging message is not directed to the terminal device, and determine that the paging message is not to be received.

10. The terminal device according to claim 9, wherein the rule condition comprises at least one of following:
a value of an identifier of the terminal device mod X being Y;
a last bit of the identifier of the terminal device being Z;
last K bits of the identifier of the terminal device being $a_1 a_2 \ldots a_K$;
first L bits of the identifier of the terminal device being $b_1 b_2 \ldots b_L$; and
terminal type information of the terminal device,
wherein the X, Y, Z, a1 a2 ... aK, and b1 b2 ... bL are known numbers.

11. A network device, comprising:
an output interface, configured to send, to a terminal device, a physical downlink control channel (PDCCH) used for scheduling a paging message, wherein
the PDCCH comprises downlink control information (DCI) which includes indication information, to enable the terminal device to determine whether to receive the paging message according to the indication information, wherein the indication information is used for indicating whether there is a paging message; or,
the PDCCH comprises DCI which includes indication information and rule information, to enable the terminal device to determine whether to receive the paging message according to the indication information and the rule information, wherein the indication information is used for indicating whether there is a paging message, and the rule information is used for the terminal device to determine whether the paging message is directed to the terminal device.

12. The network device according to claim 11, wherein the rule information is used for indicating a rule condition that identifier information of the terminal device needs to satisfy.

13. The network device according to claim 12, wherein the rule condition comprises at least one of following:
a value of an identifier of the terminal device mod X being Y;
a last bit of the identifier of the terminal device being Z;
last K bits of the identifier of the terminal device being $a_1 a_2 \ldots a_K$;
first L bits of the identifier of the terminal device being $b_1 b_2 \ldots b_L$; and
terminal type information of the terminal device,
wherein the X, Y, Z, $a_1 a_2 \ldots a_K$, and $b_1 b_2 \ldots b_L$ are known numbers.

* * * * *